May 6, 1969 G. M. BABIC 3,442,180
FAIL SAFE SENSING DEVICE
Filed June 28, 1966
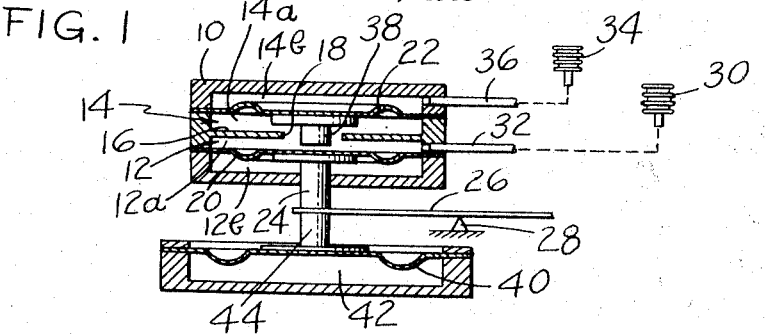
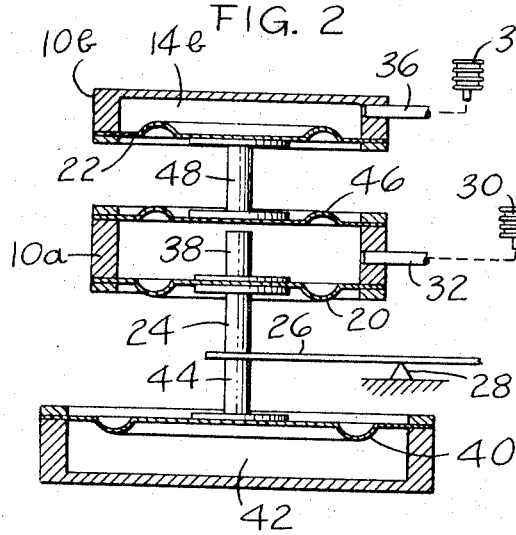
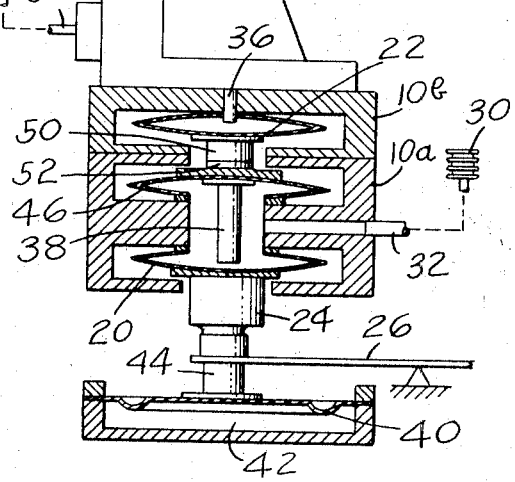
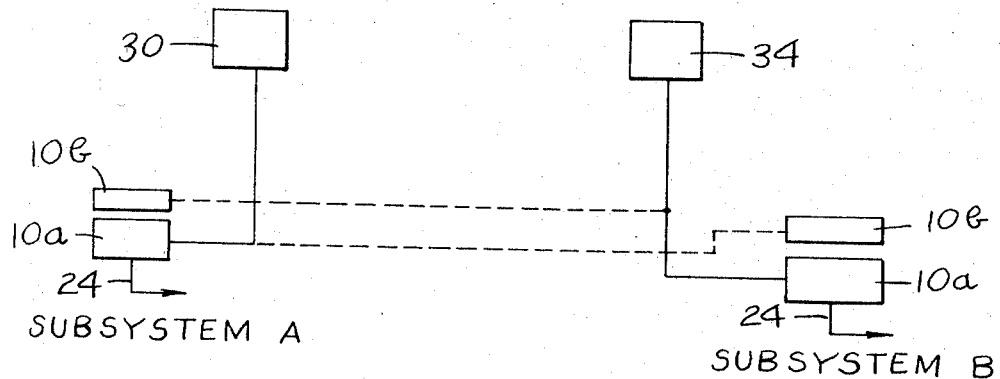
INVENTOR
GEORGE M. BABIC
BY Fishman + VanKirk
ATTORNEY

United States Patent Office 3,442,180
Patented May 6, 1969

3,442,180
FAIL SAFE SENSING DEVICE
George M. Babic, West Hartford, Conn., assignor to United Aircraft Corporation, East Hartford, Conn., a corporation of Delaware
Filed June 28, 1966, Ser. No. 561,226
Int. Cl. F01b *19/04*
U.S. Cl. 92—48                                    25 Claims

ABSTRACT OF THE DISCLOSURE

A fail safe condition sensor comprising a first diaphragm which is deflected in accordance with the condition to be sensed, the first diaphragm being operatively connected to an output shaft, and a second diaphragm which is normally isolated from the first diaphragm output connection. Isolation of the second diaphragm is accomplished by subjecting the opposite sides thereof to one or more conditions to be sensed. Failure of the first diaphragm or the primary condition sensing device associated therewith results in the moving of the second diaphragm into mechanical connection with the first diaphragm output shaft whereby the sensor unit will remain operative.

---

This invention relates to a fail safe sensing device. More particularly, this invention relates to a fail safe sensing device in which a normally inactive backup sensing unit is automatically brought into operation in the event of a failure in a primary sensing unit.

In an ordinary type of sensing system, such as, for example but not by way of limitation, a temperature sensing system, a fluid is contained in a constant volume system, and the pressure of the fluid varies with changes in the temperature to be sensed. The pressure of the fluid is converted to a force output through a diaphragm, and the force output is measured to determine the value of the condition to be sensed. A leak, whether slow or fast, in the fluid system could result in an output error and eventually in complete failure of this system.

In the present invention, two sensing systems are employed in an arrangement wherein one sensing unit is mounted on top of the other. One unit is a primary unit and a normally operative unit; the other unit is a backup and normally inoperative or isolated unit. During normal operation the primary unit does all of the work while the secondary or backup unit is inactive due to a combination of pressure induced forces which isolates it from the primary unit, the combination of pressure induced forces preferably creating a balance across the secondary unit to minimize stresses during the inactive period of the secondary unit.

In the event of a failure in the primary sensing system the isolation of the secondary unit is removed, and the secondary unit becomes active. Activation of the secondary unit results in the creation of a connection between the pressure responsive mechanism of the secondary unit and the pressure responsive mechanism of the primary unit so that the pressure responsive mechanism of the secondary unit works through the primary unit to deliver a substitute signal to the regular output mechanism associated with the primary unit.

If desired, the secondary system can be designed to withstand greater stresses than the primary system so that the secondary system will not be susceptible to failure in the event that it is called into operation. The primary unit can then be designed for extreme accuracy and sensitivity with the knowledge that if the primary unit should fail the rugged secondary unit will come into operation and be highly unlikely to fail. Also, the secondary unit can, such as by varying the sensing area of a diaphragm, be designed to provide a definite indication that it has been brought into operation by causing the ultimate output signal to vary over a range of values distinctly different from the ordinarily expected range of values for the condition to be sensed.

The present invention also possesses the advantage that the primary and secondary sensing units can be separable or detachable so that a separate sensing device, such as a temperature sensing bulb, can be used with each sensing unit. Thus, the present invention can readily take advantage of the situation wherein separate sensing bulbs are used to provide a measure of the same condition to two different control units. For example, in a jet engine fuel control system two temperature bulbs may be used to sense a condition such as compressor inlet temperature, one sensing bulb being connected to the main fuel control and the other sensing bulb being connected to the afterburner fuel control. The present invention could readily take advantage of the presence of these two temperature sensing bulbs by having each bulb serve as the sensing signal to the primary sensing mechanism of one system and also providing the secondary sensing signal to the sensing unit of the other system. In other words, one temperature bulb could be connected in the primary system for the main fuel control to provide the signal to the primary unit for the main fuel control, and this bulb would also be connected in the secondary system of the afterburner fuel control to provide a signal to the secondary unit of the afterburner fuel control. The other temperature sensing bulb would be connected in the primary system of the afterburner fuel control to provide a signal to the primary unit of the afterburner fuel control, and this other sensing bulb would also be connected in the secondary system of the main engine fuel control to provide a signal to the secondary unit of the main engine fuel control. In this way, the fail safe protection which can be achieved through the present invention can be accomplished without increasing the actual number of condition sensing elements.

The fail safe feature of the present invention operates equally well and effectively for both a slow leak or a rapid leak in the primary sensing system, but it is especially effective in eliminating the sensing error associated with a slow leak condition. The special effectiveness of the present invention in the slow leak situation results from the fact that the pressure which generates the normal primary system signal also contributes to isolating the secondary system. Thus, if a slow leak developes in the primary sensing system, the force isolating the secondary system is reduced as the error in the primary system increases; thus, the primary and secondary systems can be designed so that the secondary system will be connected to the output at a predetermined leak rate or error rate in the primary system.

Accordingly, one object of the present invention is to produce a novel fail safe condition sensing device.

Another object of the present invention is to produce a novel fail safe condition sensing device in which a secondary or backup system is automatically brought into operation in the event of a failure in the primary sensing system.

Still another object of the present invention is to produce a novel fail safe condition sensing device in which a secondary or backup sensing system is automatically brought into operation, in the event of a failure in the primary sensing system, to deliver an output signal through the primary sensing system to the output mechanism of the primary sensing system.

Still another object of the present invention is to produce a novel fail safe condition sensing device having a primary sensing system and a secondary sensing system, and in which the primary and secondary sensing systems are separable or detachable.

Still another object of the present invention is to produce a novel fail safe condition sensing device having a primary sensing system and a secondary sensing system, and in which the secondary sensing system is normally isolated from the primary sensing system.

Still another object of the present invention is to produce a novel condition sensing device having a primary sensing system and a secondary sensing system, and in which the secondary sensing system is normally isolated from the primary system by a force which is also used to generate the output signal from the primary sensing system.

Other objects and advantages will be apparent from the following detailed description and drawings.

In the drawings wherein like elements are similarly numbered in the several figures:

FIGURE 1 is a sectional elevation view of one embodiment of the fail safe condition sensing device of the present invention.

FIGURE 2 is a sectional elevation view of another embodiment of the fail safe condition sensing device of the present invention.

FIGURE 3 is a sectional elevation view of still another embodiment of the fail safe condition sensing device of the present invention.

FIGURE 4 is a schematic representation of a system employing two of the fail safe condition sensing devices of the present invention.

Referring now to FIGURE 1, a casing 10 contains a first chamber 12 and a second chamber 14, chambers 12 and 14 being formed by a barrier or divider 16 in casing 10. An opening 18 in divider 16 provides a connection between chambers 12 and 14. A first flexible load responsive diaphragm 20 is located in chamber 12, diaphragm 20 being secured in the walls of casing 10 and dividing chamber 12 into spaces 12a and 12b. Diaphragm 20 is the primary load responsive element or condition responsive element in the fail safe condition sensing device of FIGURE 1. A second diaphragm 22 is located in chamber 14, diaphragm 22 also being secured in the walls of casing 10 and dividing chamber 14 into spaces 14a and 14b. Diaphragm 22 is the secondary or backup load responsive or condition responsive element in the embodiment shown in FIGURE 1. An output shaft 24 is connected to primary diaphragm 20 and passes through casing 10. Output shaft 24 is connected to a link 26 which is pivotable about a support 28 and which is connected to any suitable known type of indicating or recording device.

A fluid, such as nitrogen gas, is encased in chambers 12 and 14 between primary diaphragm 20 and secondary diaphragm 22, i.e. in spaces 12a and 14a. Thus, diaphragms 20 and 22 define an essentially constant volume, fluid filled space therebetween. A condition sensing element such as a temperature sensing bulb 30 is exposed to a condition to be sensed and is connected via conduit 32 to the space between primary diaphragm 20 and secondary diaphragm 22. Both temperature sensing bulb 30 and conduit 32 are also filled with a fluid such as nitrogen gas so that temperature sensing bulb 30, conduit 32 and the space between diaphragms 20 and 22 form a first substantially constant volume fluid filled system.

The space 14b in chamber 14 between diaphragm 22 and the upper wall of casing 10 is also filled with nitrogen gas, and a second nitrogen gas filled temperature sensing bulb 34 is connected via gas filled conduit 36 to space 14b. Temperature sensing bulb 34 may either be exposed to the same temperature to which temperature sensing bulb 30 is exposed or to another temperature which bears a known relation to the temperature to which bulb 30 is exposed. Space 14b, conduit 36 and temperature sensing bulb 34 form a second substantially constant volume fluid filled sensing system.

In the operation of the device shown in FIGURE 1, the pressures in communicating spaces 12a and 14a are equal and are directly related to the temperature of the environment to which temperature sensing bulb 30 is exposed. Changes in the temperature of the environment to which temperature sensing bulb 30 is exposed result in equal changes of pressure of the gas between diaphragms 20 and 22. The gas between diaphragms 20 and 22 loads diaphragm 20 in a downward direction with a primary load and causes a deflection of diaphragm 20 proportional to the gas pressure and hence in proportion to the temperature to which temperature sensing bulb 30 is exposed. Similarly, the gas between diaphragms 20 and 22 loads diaphragm 22 in an upward direction with a force proportional to the temperature to which bulb 30 is exposed, the upward force being referred to as a counter or isolating force or load. The gas in space 14b loads diaphragm 22 in a downward direction with a force proportional to the temperature to which temperature sensing bulb 34 is exposed, the downward force being referred to as a secondary force or load.

As can be seen from the foregoing description, primary diaphragm 20 is loaded with a primary load in proportion to the temperature to be sensed while secondary diaphragm 22 is loaded with two oppositely directed loads. The oppositely directed loads on secondary diaphragm 22 are preferably equal so that a complete force balance is established across diaphragm 22 so that stresses are minimized or eliminated during the time when the opposite loads are imposed across diaphragm 22. Although it is preferable that the loads on secondary diaphragms 22 be equal and opposite, the unit can also be designed so that the downwardly directed load from the gas in space 14b is less than the upwardly directed load. The prime consideration is that a follower or connecting rod 38 attached to secondary diaphragm 22 be normally isolated from primary diaphragm 20 and thus isolated from output shaft 24 and link 26. This normal isolation of connecting rod 38 is accomplished by the forces generated on each side of diaphragm 22 which either establish a force balance or an upwardly directed unbalance across diaphragm 22 so that there is normally a gap between connecting rod 38 and primary diaphragm 20. Thus, in the normal operation of the device shown in FIGURE 1, secondary diaphragm 22 is isolated, and output shaft 24 and link 26 are actuated as a function of the temperature to which temperature sensing bulb 30 is exposed. A standard type of balance for ambient changes is provided through a diaphragm 40 which communicates with an evacuated chamber 42 and is connected via a follower 44 to link 26.

In the event that a failure, such as a leak, occurs in the primary sensing system the gas pressure in the space between diaphragm 20 and 22 will drop. This pressure drop would ordinarily result in either a serious error or a complete malfunction of an indicating system. However, in the device of the present invention the secondary system is automatically brought into operation upon the occurrence of the failure in the primary system. The pressure drop in the gas between diaphragms 20 and 22 also results in a decrease in the upward force previously imposed on diaphragm 22. The isolating effect previously resulting from this upward counter force is removed, and diaphragm 22 is deflected downwardly by the loading of the pressurized gas in space 14b to close the gap between and bring connecting rod 38 into contact with diaphragm 20. Thereafter, changes in the temperature to which temperature sensing bulb 34 is exposed are reflected through the loading on secondary diaphragm 22 to output shaft 24 and output link 26 so that the device shown in FIGURE 1 continues to provide an indication of the desired temperature condition despite the failure in the primary sensing system.

Referring now to FIGURE 2, an alternative arrangement of elements for the present invention is shown. The casing 10 is divided into sections 10a and 10b. The 10a section houses primary diaphragm 20 and also houses a third diaphragm 46 which forms part of the isolation mechanism. Nitrogen gas is contained between diaphragms 20 and 46, and primary temperature sensing bulb 30 communicates via conduit 32 with the gas between diaphragms 20 and 46 to vary the pressure of the gas in accordance with the temperature to which temperature sensing bulb 30 is exposed. The space between diaphragms 20 and 46 corresponds to the spaces 12a and 14a in FIGURE 1. The section 10b of the casing houses secondary diaphragm 22 which cooperates with the upper wall of the casing to define space 14b. Secondary temperature sensing bulb 34 communicates via conduit 36 with the gas in space 14b to provide a downwardly directed load on secondary diaphragm 22. A connecting element 48 extends between and joins secondary diaphragm 22 and third diaphragm 46, and connecting element 48 is preferably a one-piece element, although it can be made of two mating parts of which one part of each is attached to one of the diaphragms.

The pressures generated in the gas between diaphragms 20 and 46 impart an upward counter or isolating loading on diaphragm 46 and a downward primary loading on diaphragm 20 proportional to the temperature to which bulb 30 is exposed. The upward force on diaphragm 46 is transmitted through connecting element 38 to interact with the downward secondary force on diaphragm 22 to isolate diaphragm 22 from output elements 24 and 26. The upward force on diaphragm 46 keeps diaphragm 46 out of contact with follower or connecting rod 38 which, in the FIGURE 2 embodiment, is affixed to diaphragm 20. In view of the isolation of diaphragm 22, the normal output delivered to shaft 24 and link 26 is a function of the temperature sensed by temperature sensing bulb 30.

Upon the occurrence of a failure in the primary sensing system the upward force on diaphragm 46 is removed. The downward force on diaphragm 22 deflects diaphragm 22 downwardly and acts through connector 48 to deflect diaphragm 46 downwardly to bring diaphragm 46 into contact with follower 38. The action of output shaft 24 and link 26 is then determined by the loading on diaphragm 22 which is in turn a function of the temperature to which bulb 34 is exposed.

Referring now to FIGURE 3, another embodiment of the present invention is shown. The casing is again divided into sections 10a and 10b, the section 10b in the FIGURE 3 embodiment being separable or detachable from the 10a section. Primary sensing bulb 30 communicates via conduit 32 with a space between primary diaphragm 20 and a third diaphragm 46. Secondary sensing bulb 34 communicates via conduit 36 with secondary diaphragm 22 in casing section 10b. A follower section 50 is attached to diaphragm 22 and is in contact with a follower section 52 similarly attached to third diaphragm 46. Follower sections 50 and 52 are in mating contact but are separable or detachable elements. Connecting rod 38 is attached to diaphragm 46 and extends toward diaphragm 20. As in the previous embodiments, diaphragm 22 is normally isolated from diaphragm 20, the isolation in the FIGURE 3 embodiment occurring through the interaction of the upward counter force on diaphragm 46 and the downward secondary force on diaphragm 22, preferably a force balance, which normally establishes a gap between connecting rod 38 and diaphragm 20. As in the previous embodiments, a failure in the primary sensing system reduces the gas pressure between diaphragms 20 and 46 so that the downward pressure on diaphragm 22 then closes the gap between follower 38 and diaphragm 20 so that the temperature responsive loadings on diaphragm 22 are transmitted through output shaft 24 and link 26. The FIGURE 3 embodiment possesses the characteristic that the unit including casing section 10b, secondary diaphragm 22 and follower 50 can be completely separated or detached from the rest of the sensing device. Thus, parts of the device can be readily interchanged or replaced for such reasons as repairs or to transfer the backup capability from one primary system to another.

Referring now to FIGURE 4, a schematic representation is shown for employment of the present invention. FIGURE 4 shows an overall system having two subsystems, subsystem A and subsystem B, each of which embodies the present invention. Although each subsystem could have its own primary and secondary sensing bulbs 30 and 34, for a total of four bulbs, the FIGURE 4 embodiment shows an arrangement wherein two bulbs can be used to provide both primary and secondary signaling to both subsystems. Each of the subsystems includes a unit of the present invention such as shown in FIGURE 3 with a casing section 10a and all associated structure including the output structure and a casing section 10b. In subsystem A primary sensing bulb 30 communicates with casing section 10a to provide the primary signal, and secondary bulb 34 communicates with casing section 10b to provide the secondary or backup signal. Conversely, in subsystem B the bulb 34 communicates with casing section 10 to provide the primary signal, and bulb 30 communicates with casing 10b to provide the secondary or backup signal. Bulbs 30 and 34 may be both exposed to a common condition, or they may be exposed to different conditions having a known relationship.

In any of the embodiments shown and described, it may be desirable to include a charge indicating device of the type commonly employed with items such as fire extinguishers to sense the presence of pressure in the secondary system. In this manner a failure in an inactive secondary system can be discovered to avoid the situation of having a defective secondary system backing up a operating primary system.

While preferred embodiments of the present invention have been shown and described, various modifications and substitutions may be made without departing from the spirit and scope of this invention. Accordingly, it is to be understood that this invention has been described by way of illustration rather than limitation.

What is claimed is:
1. A fail safe condition sensing device including:
   a first condition sensing system, said first system having a first flexible element responsive to fluid pressure loading thereon;
   a second condition sensing system, said second system having a second flexible element responsive to fluid pressure loadings thereon;
   output means connected to said first element for generating an output signal in response to a load on said first element;
   isolation means normally isolating said second element from said first element; and
   connecting means for connecting said second element to said first element in the event of a pressure reducing failure in said first sensing system reducing the pressure loading on said first element to generate an output signal from said output means in response to a load on said second element, said connecting means extending from one of said first and second elements toward the other of said elements and being normally spaced from said other element.

2. A fail safe condition responsive device as in claim 1 wherein each of said first and second sensing systems is a substantially constant volume system having a fluid filled chamber connected to a fluid filled device, said fluid filled device being exposed to a condition to be sensed.

3. A fail safe condition sensing device as in claim 1 wherein said isolation means includes means for transmitting to said second element a load commensurate with a load on said first element.

4. A fail safe condition sensing device as in claim 1 wherein said connecting means includes follower means disposed between said first and second elements, said follower means normally being out of contact with one of said first and second elements during isolation of said second element, and said follower means being in contact with both of said first and second elements for connection of said second element to said first element in the event of a failure in said first sensing system.

5. A fail safe condition sensing device as in claim 4 wherein said follower means is attached to said second element.

6. A fail safe condition sensing device including:
a first condition sensing system, said first condition sensing system having a first chamber, a first flexible element responsive to fluid pressure loadings associated with said first chamber, and first condition sensing means associated with said first chamber for imposing a primary load on said first flexible element commensurate with a condition to be sensed;
a second condition sensing system, said second condition sensing system having a second chamber, a second flexible element responsive to fluid pressure loadings associated with said second chamber, and second condition sensing means associated with said second chamber for imposing a secondary load of said second flexible element commensurate with a condition to be sensed;
output means connected to said first flexible element for normally generating an output signal in response to said primary load on said first element;
isolation means normally isolating said second flexible element from said first flexible element; and
follower means connected to said second flexible element and extending toward said first flexible element, said follower means normally being out of contact with said first flexible element, and said follower means contacting said first flexible element in the event of a pressure reducing failure in said first sensing system reducing the pressure loading on said first element to generate an output signal from said output means in response to said secondary load on said second flexible element.

7. A fail safe condition sensing device as in claim 6 wherein said isolation means includes means for transmitting to said second flexible element a counter load commensurate with said primary load on said first flexible element and opposite to said secondary load on said second flexible element to balance said second flexible element.

8. A fail safe condition sensing device as in claim 6 wherein each of said first and second condition sensing means includes a substantially constant volume system having a fluid filled chamber connected to a fluid filled device exposed to a condition to be sensed.

9. A fail safe condition sensing device as in claim 8 including a compensating reference system cooperating with said output means to compensate for ambient changes.

10. A fail safe condition sensing device including:
a first condition sensing system, said first condition sensing system having a first chamber and a first load responsive diaphragm in said first chamber;
a second condition sensing system, said second condition system having a second chamber and a second load responsive diaphragm in said second chamber;
said first and second chambers being interconnected to expose one side of each of said diaphragms to the other of said diaphragms;
a fluid contained between said first and second diaphragms, said one side of each of said first and second diaphragms being exposed to said fluid;
a fluid in said second chamber on the other side of said second diaphragm;
a first fluid filled sensing element exposed to a condition to be sensed and connected to communicate with said fluid between said first and second diaphragms to impose a primary load on said first diaphragm commensurate with a condition to be sensed and a counter load on said second diaphragm commensurate with a condition to be sensed;
a second fluid filled sensing element exposed to a condition to be sensed and connected to communicate with said fluid on the other side of said second diaphragm to impose a secondary load on said second diaphragm,
said secondary and counter loads on said second diaphragm being opposing loads and interacting to normally isolate said second diaphragm;
output means extending from the other side of said first diaphragm for normally generating an output signal in response to said primary load on said first diaphragm; and
follower means attached to said second diaphragm on said one side thereof and extending toward said one side of said first diaphragm, said follower means normally being out of contact with said first diaphragm, and said follower means contacting said first diaphragm in the event of a failure in said first condition sensing system to generate an output signal from said output means in response to said secondary load on said second diaphragm.

11. A fail safe condition sensing device as in claim 10 including a compensating reference system cooperating with said output means to compensate for ambient changes.

12. A fail safe condition sensing device as in claim 10 wherein said opposing secondary and counter loads on said second diaphragm are substantially equal.

13. A fail safe condition sensing device as in claim 10 wherein said first and second fluid filled elements are both exposed to a common condition to be sensed.

14. A fail safe condition sensing device including:
a first condition sensing system, said first condition sensing system having a first load responsive diaphragm and a first fluid filled condition sensing element exposed to a condition to be sensed;
a second condition sensing system, said second condition sensing system having a second load responsive diaphragm and a second fluid filled condition responsive element exposed to a condition to be sensed;
a third load responsive diaphragm in spaced relation with said first diaphragm, said third diaphragm cooperating with said first diaphragm to define a chamber therebetween;
a fluid in said chamber, said first fluid filled condition responsive element communicating with said fluid in said chamber to impose a primary load on said first diaphragm commensurate with a condition to be sensed and a counter load on said third diaphragm;
a fluid for loading said second diaphragm, said second fluid filled condition responsive element communicating with said fluid for loading said second diaphragm to impose a secondary load on said second diaphragm;
load transmitting means interconnecting said second and third diaphragms, said secondary load and said counter load being opposing loads and interacting through said load transmitting means to normally isolate said second diaphragm;
output means extending from said first diaphragm on the side thereof removed from said third diaphragm for normally generating an output signal in response to said primary load on said first diaphragm; and
follower means attached to one of said first and third diaphragms and extending toward the other of said first and third diaphragms, said follower means normally being out of contact with said other diaphragm, and said follower means and said other diaphragm coming into contact to impose said secondary load on said output means through said load transmitting means to generate an output signal from said output means commensurate with said secondary load in the event of a failure in said first condition sensing system.

15. A fail safe condition sensing device as in claim 14 including a compensating reference system cooperating with said output means to compensate for ambient changes.

16. A fail safe condition sensing device as in claim 14 wherein said secondary and counter loads are substantially equal.

17. A fail safe condition sensing device as in claim 14 wherein said first and second fluid filled elements are both exposed to a common condition to be sensed.

18. A fail safe condition sensing device including:
a first condition sensing system, said first condition sensing system having a first chamber, a first flexible load responsive element therein, a second flexible load responsive element therein, a fluid contained between said first and second load responsive elements, and a first fluid filled condition responsive element communicating with said fluid between said first and second load responsive elements;
said first fluid filled condition responsive element being exposed to a condition to be sensed and imposing a primary load on said first load responsive element and a counter load on said second load responsive element;
a second condition sensing system, said second condition sensing system having a second chamber, a third flexible load responsive element therein, and a second fluid filled condition responsive element exposed to a condition to be sensed and communicating with said third load responsive element to impose a secondary load on said third load responsive element;
load transmitting means between said second and third load responsive elements, said secondary and counter loads being opposing loads and interacting through said load transmitting means to normally isolate said third load responsive element;
output means extending from said first load responsive element for normally generating an output signal in response to said primary load on said first load responsive element; and
follower means attached to one of said first and second load responsive elements and extending toward the other of said first and second load responsive elements, said follower means normally being out of contact with said other load responsive element, and said follower means and said other load responsive element coming into contact to impose said secondary load on said output means through said load transmitting means to generate an output signal from said output means commensurate with said secondary load in the event of a failure in said first condition sensing system.

19. A fail safe condition sensing device as in claim 18 wherein said first and second condition sensing systems are separable.

20. A fail safe condition sensing device as in claim 18 including a compensating reference system cooperating with said output means to compensate for ambient changes.

21. A fail safe condition sensing device as in claim 18 wherein said secondary and counter loads are substantially equal.

22. A fail safe condition sensing device as in claim 18 wherein said first and second fluid filled elements are both exposed to a common condition to be sensed.

23. A fail safe condition sensing system including at least two subsystems, each of said subsystems having:
(a) a first unit having a primary load responsive element,
(b) a second unit having a secondary load responsive element,
(c) isolation means normally isolating said secondary load responsive element from said primary load responsive element,
(d) output means connected to said primary load responsive element for generating an output signal in response to a load on said primary load responsive element, and
(e) connecting means for connecting said secondary load responsive element to said primary load responsive element in the event of a failure in said first sensing system to generate an output signal from said output means in response to a load on said secondary load responsive element;
first condition sensing means exposed to a condition to be sensed;
second condition sensing means exposed to a condition to be sensed;
said first condition sensing means communicating with said primary load responsive element in one of said subsystems to load said primary load responsive element in said one subsystem in accordance with the condition to which said first condition sensing means is exposed, and said first condition sensing means communicating with said secondary load responsive element in another of said subsystems to load said secondary load responsive element in said another subsystem in accordance with the condition to which said first condition sensing means is exposed; and
said second condition sensing means communicating with said secondary load responsive element in said one subsystem to load said secondary load responsive element in said one subsystem in accordance with the condition to which said second condition sensing means is exposed, and said second condition sensing means communicating with said primary load responsive element in said another of said subsystems to load said primary load responsive element in said another subsystem in accordance with the condition to which said second condition sensing means is exposed.

24. A fail safe condition sensing system as in claim 23 wherein said first and second condition sensing means are exposed to the same condition.

25. A fail safe condition sensing system as in claim 23 wherein said first and second condition sensing means are exposed to different conditions.

References Cited

UNITED STATES PATENTS

| | | | |
|---|---|---|---|
| 2,945,376 | 7/1960 | Gehre | 92—37 |
| 2,965,137 | 12/1960 | Leeson et al. | 92—37 |
| 3,074,435 | 1/1963 | Woestemeyer | 73—407 |
| 3,279,250 | 11/1963 | Hezel et al. | 73—182 |
| 3,361,037 | 1/1968 | Likavec | 92—37 |

LOUIS R. PRINCE, *Primary Examiner.*

D. O. WOODIEL, *Assistant Examiner.*

U.S. Cl. X.R.

73—368.7, 407; 92—37, 62, 64, 97